No. 645,664. Patented Mar. 20, 1900.
W. B. HART.
ANIMAL POKE.
(Application filed Nov. 1, 1899.)
(No Model.)
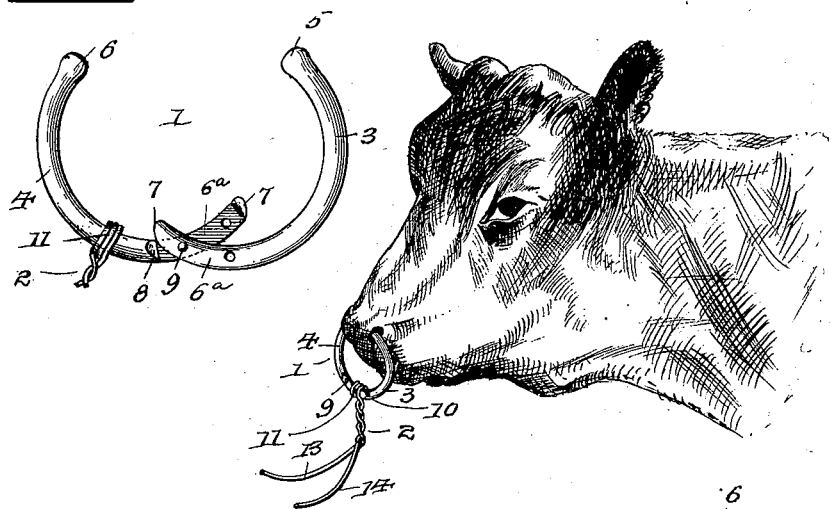
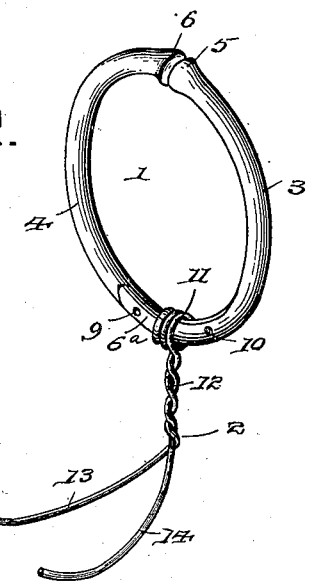
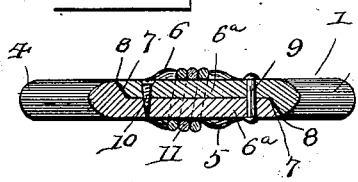
Witnesses
F. E. Alden.
W. B. Hart, Inventor,
By his Attorneys,
C. A. Snow & Co.

UNITED STATES PATENT OFFICE.

WALTER B. HART, OF DUNCAN, INDIAN TERRITORY.

ANIMAL-POKE.

SPECIFICATION forming part of Letters Patent No. 645,664, dated March 20, 1900.

Application filed November 1, 1899. Serial No. 735,496. (No model.)

*To all whom it may concern:*

Be it known that I, WALTER B. HART, a citizen of the United States, residing at Duncan, in the county of Chickasaw, Indian Territory, have invented a new and useful Animal-Poke, of which the following is a specification.

This invention relates to animal-pokes, and has for its object to provide an improved device of this character which may be readily applied to the nostrils of an animal without piercing the same and at the same time insures a strong connection therewith, so as to prevent accidental displacement, while permitting of the convenient removal thereof. Furthermore, it is designed to detachably and adjustably mount the poke proper upon the connection with the animal's nostrils, so as to facilitate the application of the device to replace a broken poke and also to permit of the substitution of different-sized pokes.

To these ends the present invention consists in the combination and arrangement of parts, as will be hereinafter more fully described, shown in the accompanying drawings, and particularly pointed out in the appended claim, it being understood that changes in the form, proportion, size, and minor details may be made within the scope of the appended claim without departing from the spirit or sacrificing any of the advantages of the invention.

In the drawings, Figure 1 is a perspective view illustrating the application of the present invention to an animal. Fig. 2 is a detail perspective view of the poke detached. Fig. 3 is a transverse sectional view illustrating the adjustable connection between the attaching parts of the device. Fig. 4 is a detail elevation illustrating an adjustment of the device to facilitate the application thereof.

Corresponding parts in the several figures of the drawings are designated by like characters of reference.

Referring to the accompanying drawings, it will be seen that the present invention comprises an attaching device 1 and a poke 2, slidable thereon.

The attaching device is in the form of a split ring and comprises opposite duplicate semicircular sections 3 and 4, which are free from intermediate projections and have their free ends 5 and 6, respectively, flattened or enlarged and spaced at a suitable distance. The inner contiguous sides of the connected ends of the sections are notched longitudinally, so as to form duplicate arms $6^a$, which overlap each other, so as to provide a continuation of the ring, and have their contiguous inner sides flattened, so as to fit evenly against each other, and thereby prevent exterior projections. The free end of each arm is rounded transversely, as indicated at 7, and fits snugly the correspondingly-concaved shoulder 8 at the base of the other arm, so as to permit of lateral movement of the sections. The free end of one of the arms is pivoted to the other arm by means of a suitable transverse pivot-pin 9, and the free end of the other arm is detachably connected to the first-mentioned arm by means of a suitable screw-fastening 10, passing transversely through both arms.

From the foregoing description and by reference to Fig. 4 it will be seen that the screw-fastening 10 may be removed and the sections 3 and 4 moved apart upon the pivotal connection 9 as a center, so that the clamping ends 5 and 6 of the sections may be conveniently fitted to the nostrils of an animal, as indicated in Fig. 1, after which the fastening 10 is again applied, so as to lock the ring firmly in place. Thus it is apparent that it is not necessary to pierce the nostrils of the animal, and the device may be readily applied and removed, and at the same time accidental disconnection is prevented.

The poke proper is preferably formed from a single length of stiff wire, which is bent or coiled into one or more rings or eyes 11, located intermediate of the ends of the wire. Adjacent to the eye thus formed the opposite portions of the wire are tightly twisted together, as shown at 12, so as to form a substantially rigid and straight shank, the opposite free ends of the wire diverging laterally and bowed forwardly into hooks 13 and 14, respectively. The eye 11 is designed to slidably embrace the ring 1 and normally embraces the arms which form the adjustable connection of the ring-sections, so as to depend from the ring with the hooks 13 and 14 projecting in front of the animal, as best shown in Fig. 1. In applying the device to an animal the eye 11 is moved to one side and entirely free of the arms $6^a$, as shown in Fig.

4, so as to permit of the ring-sections being opened or moved apart, as will be understood. It is also apparent that the poke being slidably mounted upon the ring it may be removed therefrom for any desired purpose; but accidental displacement thereof is prevented by means of the enlarged terminals 5 and 6 of the respective ring-sections. Moreover, as the ring or eye 11 embraces the overlapped portions of the ring-sections it forms a fastening therefor, so as to prevent separation of the ring-sections should the fastening 10 become displaced.

What I claim is—

An animal-poke, comprising a split ring, formed of opposite duplicate substantially-semicircular ring-sections, which are free from intermediate projections, and have their contiguous ends overlapped and pivotally connected, the opposite free ends being terminally enlarged, and a poke proper, having an eye slidable upon the ring, of smaller diameter than the terminal enlargements thereof, and normally embracing the overlapped portions of the ring-sections, and a hook pendent from the eye.

In testimony that I claim the foregoing as my own I have hereto affixed my signature in the presence of two witnesses.

WALTER B. HART.

Witnesses:
J. B. PATTERSON,
COLONEL WHITENER.